A. J. DAVIS,

Assignor, by mesne assignments, to IVES, BLAKESLEE & Co.

Spinning-Top.

No. 8,768. Reissued June 24, 1879.

*Witnesses:*
Thomas E. Bick
Chandler Hall

*Inventor.*
Andrew J. Davis
by his attorney
Edwin H. Brown.

N. PETERS, PHOTO-LITHOGRAPHER, WASHINGTON, D. C.

UNITED STATES PATENT OFFICE.

ANDREW J. DAVIS, OF PITTSBURG, PENNSYLVANIA, ASSIGNOR, BY MESNE ASSIGNMENTS, TO IVES, BLAKESLEE & CO., OF NEW YORK CITY.

IMPROVEMENT IN SPINNING-TOPS.

Specification forming part of Letters Patent No. 190,421, dated May 8, 1877; Reissue No. 8,768, dated June 24, 1879; application filed March 29, 1879.

*To all whom it may concern:*

Be it known that I, ANDREW J. DAVIS, of Pittsburg, in the county of Allegheny and State of Pennsylvania, have invented a certain new and useful Improvement in Children's Tops; and I do hereby declare that the following is a full, clear, and exact description thereof, reference being had to the accompanying drawings, and to the letters of reference marked thereon.

This invention consists in a top having its body constructed to receive a cord wound upon it to effect its spinning, and a cord employed to spin the same, and attached so as to support it while spinning without becoming wound upon any part of the top or twisted by the spinning of the top; also, in the combination of a top and a cord serving to spin it and to support it while spinning, and having a swiveling connection with the top, so as to allow of the spinning of the top without the cord becoming wound upon the top or twisted; also, in the combination of a top, a cord serving to spin the top and support it while spinning, and means for connecting the cord to the top, so as to allow the spinning of the top without occasioning the winding or twisting of the cord; also, in the combination of a top, a swivel permanently attached thereto, and a cord attached to said swivel, whereby the top may be spun by the cord and supported by the cord while spinning; also, in the combination of a top and a swivel attached thereto, and provided with means for connecting to said top a cord, whereby the same may be spun and supported while spinning; also, in the combination of a cord and a device attached thereto, and adapted to be permanently connected with a top, so as to allow the spinning of the top without detachment from the cord; also, in details of construction, to be hereinafter explained.

To enable others skilled in the art with which my invention is most nearly connected to make and use it, I will proceed to describe its construction and operation.

Figure 3:
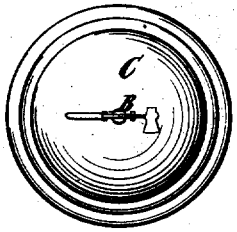
Figure 2:
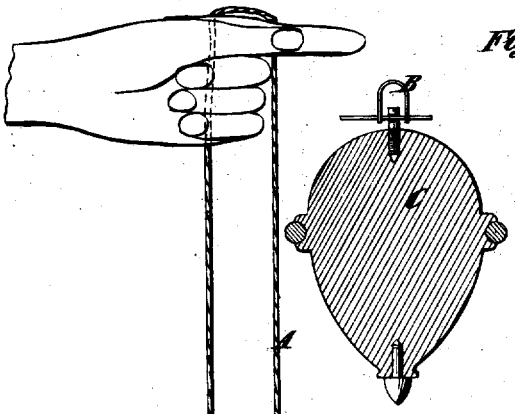
Figure 1:
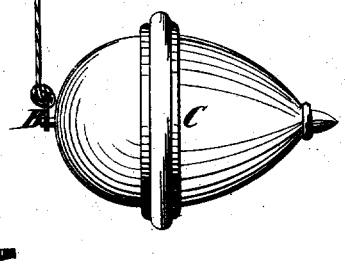

In the accompanying drawings, which form part of my specification, Figure 1 is a side view of my improvement of the child's top. Fig. 2 is a vertical section of the same. Fig. 3 is a top view or plan of the same.

In the accompanying drawings, A represents the cord, which is attached to a device pivoted to the top—in this instance to the upper part—so as to form a swivel, B. The peg-top C may be of the usual construction, and made of any material now used for constructing such tops, the body of the top being so constructed that the cord may be readily wound upon it.

The top C, represented in the accompanying drawings, is furnished with a metal ring, secured on the body of it, for the purpose of giving it greater force and a more steady action in spinning.

The cord A is wound around the top in the ordinary manner, and may be thrown from the hand of the child and spun in the usual way. The cord A being attached to the swivel B, the child can lift the top, as indicated in Fig. 1, and it will continue to spin, the axis of the top assuming a plane which is at right angles to the cord A. The child can also cause the top, while spinning, to move over the floor or ground at will.

The swiveling connection of the cord and top enables the top to be spun while attached to the cord without danger of the cord becoming wound or twisted so as to interfere with the spinning.

A top constructed as herein described and represented will not be liable to be lost in throwing it in the operation of spinning it, and will always be under the control of the child, and is susceptible of many variations in the spinning of it, making it a source of great amusement and enjoyment for the child.

What I claim as my invention, and desire to secure by Letters Patent, is—

1. A top having its body constructed to receive a cord wound upon it to effect its spinning, and a cord employed to spin the same, and attached to it so as to support it while spinning.

2. The combination of a top and a cord attached thereto in such manner that it will serve to spin the top and to support it while spinning without becoming wound upon any part of the top or twisted by the spinning of the top.

3. The combination of a top and a cord serving to spin it and support it while spinning, and having a swiveling connection with the top, so as to allow of the spinning of the top without the cord becoming wound upon the top or twisted.

4. The combination of a top and a cord serving to spin the top and support it while spinning, and means for connecting the cord to the top, so as to allow of the spinning of the top without occasioning the winding or twisting of the cord.

5. The combination of a top, a swivel permanently attached thereto, and a cord attached to said swivel, whereby the top may be spun by the cord and supported by the cord while spinning.

6. The combination of a top and a swivel attached thereto, and provided with a means for connecting to said top a cord whereby the same may be spun and supported while spinning.

7. The top C, provided with a swivel, B, and cord A, attached permanently thereto, substantially as described, whereby, when the top is spun, it can be supported in a horizontal position with relation to the cord, and is at all times under control, so as to be moved about or made to assume various positions, as set forth.

ANDREW J. DAVIS.

Witnesses:
GEO. F. TURNER,
FLORENCE KRAMER.